United States Patent [19]
König et al.

[11] Patent Number: 5,566,200
[45] Date of Patent: Oct. 15, 1996

[54] PROCESS AND DEVICE FOR DISPOSAL OF FILTER MATERIALS

[75] Inventors: Heribert König, Duisburg; Heinz Stark, Essen, both of Germany

[73] Assignee: Mannesmann Aktiengesellschaft, Dusseldorf, Germany

[21] Appl. No.: 219,195

[22] Filed: Mar. 28, 1994

[30] Foreign Application Priority Data

Mar. 26, 1993 [DE] Germany ............... 43 10 779.6

[51] Int. Cl.$^6$ ...................................... F27D 3/00
[52] U.S. Cl. ................... 373/82; 373/9; 110/345
[58] Field of Search ................... 373/2, 8–9, 60, 373/79, 81–82, 85; 110/128, 345; 75/685, 672; 423/442

[56] References Cited

U.S. PATENT DOCUMENTS

| | | | |
|---|---|---|---|
| 3,471,626 | 10/1969 | Weese et al. | 373/80 |
| 3,585,269 | 6/1971 | Krause | 373/80 |
| 4,816,230 | 3/1989 | Bortnik et al. | 422/232 |
| 5,402,439 | 3/1995 | Bullmann et al. | 373/9 |
| 5,410,566 | 4/1995 | Steins et al. | 373/82 |

FOREIGN PATENT DOCUMENTS

| | | |
|---|---|---|
| 2132352 | 6/1972 | Germany . |
| 29 00 864 C2 | 8/1987 | Germany . |
| 39 30 852 C1 | 10/1990 | Germany . |
| 38 30 392 C2 | 11/1990 | Germany . |
| 41 11 385 A1 | 10/1992 | Germany . |

*Primary Examiner*—Tu Hoang
*Attorney, Agent, or Firm*—Cohen, Pontani, Lieberman & Pavane

[57] ABSTRACT

A process and low-shaft furnace for disposing of filter material. The material to be disposed of is charged via a charging device onto and/or into a slag bath in the furnace. Simultaneously, additives comprising fluxing agents, slag-making constituents and reducing agents are introduced into the slag via a separate immersion lance. Finally, during the introduction of the additives the variables forming the electrical resistance, essentially the electrodiameter, center distance between the electrodes, level of the slag bath, and the immersion depth of the electrodes in the bath are adjusted so that 70% of the electrical energy is introduced between the electrodes and 30% of the electrical energy is introduced between the electrodes and the metal bath on the hearth bottom.

17 Claims, 4 Drawing Sheets

PROCESS AND DEVICE FOR DISPOSAL OF FILTER MATERIALS

BACKGROUND OF THE INVENTION

1. Field of the Invention

The invention is directed to a process for the disposal of filter dust, sludge and ash in which the material to be disposed of is combined with the meltable slag of an electric low-shaft furnace. The invention also relates to low-shaft furnaces which are suitable for implementing the process.

2. Description of the Prior Art

A process for the disposal of bulk materials is known from the German Patent 38 30 392. In this process, filter dust or sludge is introduced into a slag layer located in an electric furnace. Injectors, immersion lances, screw conveyors or agitators are suggested as devices for charging the materials to be disposed of. By introducing the bulk materials directly into the slag, the disposal capacity is limited by the short dwell time in the slag, among other things.

A method for disposal of filter dust in which the dust is blown into a vessel containing the process slag outside the plant is known from the German Patent 39 30 852. In this case, the immersion depths and angular position of the lance are adapted to the dust charge. The subject matter of this patent concerns influencing the foaming of the slag when the dust is blown in. This patent does not mention the adjustment of the immersion depth as a function of the lance consumption.

Further, the German Patent 29 00 864 describes a method for blowing powdered material into a metallurgic melt in which the powder is conveyed below the surface of the melt by carrier gas under particularly high pressure. In this process for oxidizing and/or refining metallurgic melts, only small quantities of powdered material can be introduced into the melt. The processes mentioned above substantially influence possible recycling, particularly deposition of the slag.

SUMMARY OF THE INVENTION

The present invention has the object of providing a process and a device suited thereto for increasing the amount of filter materials such as dust, sludge and ash which can be charged in the meltable slag of low-shaft furnaces by means of a simple construction. Further, maximum quantities of by-products or valuable materials are to be obtained from the slag.

Pursuant to these objects, and others which will become apparent hereafter, one aspect of the present invention resides in a method for disposing of filter materials, in which the material to be disposed of is charged via a charging device onto and/or into the slag bath. At the same time, additives comprising fluxing agents, slag-making constituents and reducing agents are introduced into the slag via a separate immersion lance. During the charging of the additives the variables forming the electrical resistance, which variables essentially are the electrode diameter, the center distance between the electrodes, and the immersion depth of the electrodes, are adjusted so that 70% of the electrical energy is introduced between the electrodes and 30% of the electrical energy is introduced between the electrodes and the metal bath on the hearth bottom.

Another aspect of the present invention resides in a low-shaft furnace having at least three electrodes which project through the lid of the closed furnace vessel into the meltable slag floating on a metal bath in the lower vessel of the furnace. The electrodes have a diameter with a ratio to the center distance between the electrodes of $D/M=0.25-0.35$. At least one feed tube of a waste material feed device opens out into the upper vessel of the low shaft furnace below the lid and a lance, which can be fastened to a vertically movable support arm and is connected to a burdening means and communicates with the furnace lid via a sliding seal, is arranged axially parallel to the electrodes and equidistant therefrom.

Surprisingly, the proposed process and device significantly increase the process-active volume of the slag. The process-active volume is defined as the sum of a melt-active volume and a reaction-active volume. The melt-active volume is the slag volume which absorbs filter materials melted in the region of the tips of the electrodes. There develops below the electrode only a relatively small heating volume in which e.g. the filter dust melts and is absorbed by the surrounding slag. This melt-active volume can only be increased slightly.

The reaction-active volume is the slag volume in which the reducing agent reacts with the slag. In the region of the immersed electrodes, the reducing agent added to the slag is captured by the lifting force and, insofar as the reducing agent is added in the region of the electrode, rises to the surface of the slag in the field directly surrounding the tips of the electrodes. It is only along this short path with this small volume surrounding the respective electrode tip that the reducing agent has time to react with the slag. The amount of reducing agent which cannot achieve reaction forms a deposit on the surface of the slag.

As a result of the proposed process, the reduction-active volume is substantially increased, which leads to a surprisingly high increase in the quantity of filter materials for disposal. According to the invention, the reducing agent, essentially the coke breeze serving to reduce the by-product or valuable material oxides, is transported into the region of higher heat concentration. Moreover, in order to increase the dwell period of the reducing agent, it is introduced as deeply as possible into the slag layer.

In addition to the coke breeze serving as reducing agent, additional additives, namely silica sand and/or lime, are introduced into the slag through the lance. The silica sand and/or lime serves essentially to change the melting point and viscosity of the melt.

Further, the variables forming the final resistance are influenced. The highest possible heat concentration can be achieved by a purposeful designing of the furnace specifications, wherein 70% of the energy is introduced between the electrodes and roughly 30% below the electrodes.

A graphite lance which can be immersed in the slag to an adjustable depth is used to introduce the additives. This mixture of silica sand, lime and coke breeze and possibly also filter materials is intensively swirled into the slag volume by means of a carrier gas which is adjustable to an optional pressure.

The filter dust, filter sludge and filter ash are completely or at least predominantly fed directly to the slag via individual charging paths and conveying means. The filter materials can be charged onto or into the slag bath. However, in order to maximize the charging quantity while using as few conveying members as possible, the supplied material can also be charged in parallel or, if necessary, even in its entirety through electrodes provided with bore holes.

The immersion depth of the lance is maintained at a given magnitude and the chemical, abrasive and thermal consumption of the lance opening is balanced or offset by appropriate readjustment.

In one embodiment of the invention, the lance is constructed as an extra star electrode so that electrical energy in the form of thermal energy can be introduced into the slag so as to supplement the electrodes. The individual tubes can be moved into the furnace vessel in a controllable manner with respect to depth.

In another embodiment, a furnace with a total of six electrodes is provided, the lances being arranged in the respective centers of thermal energy. The specific construction is shown in FIG. 4.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
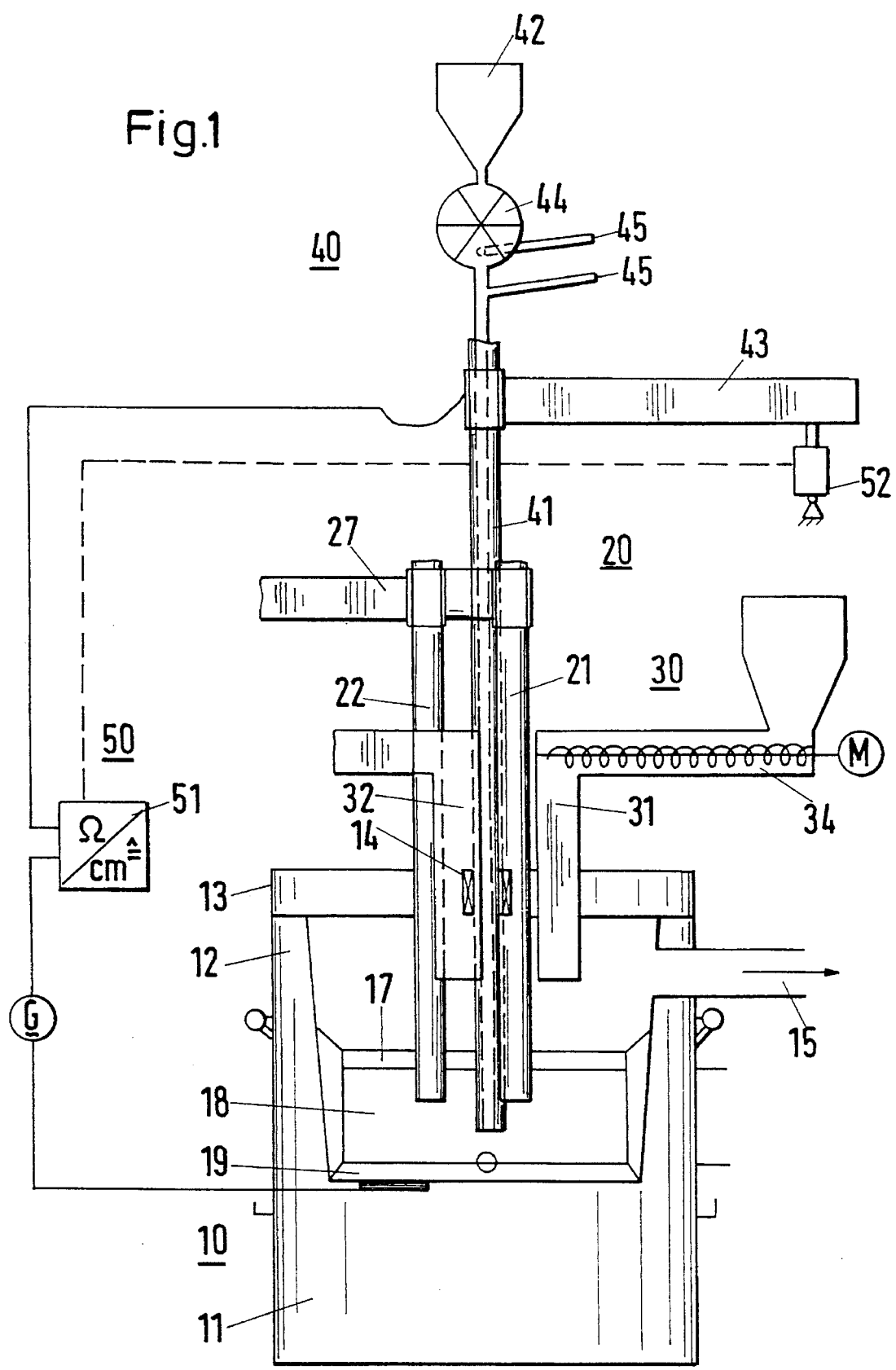
FIG. 1 is a schematic view of a section through the furnace installation pursuant to the present invention.

FIG. 1 shows a low-shaft furnace 10 with a lower vessel 12, an upper vessel 12 and a lid 13. A flue-gas suction arrangement 15 is provided in the upper vessel 11 below the lid 13. Molten metal 19 is located in the lower vessel 11 of the furnace. Slag 18 and a cover layer, coke breeze 17, lie on top of this molten metal 19. Electrodes 21 to 23 of a current supply device 20, which are fastened to an electrode support arm 27, project through the lid 13. The filter materials are fed via disposal or waste material feed devices 30 which have feed tubes 31–33 connected with screws 34–36.

The additives feed device 40 which has a lance 41 fastened to a support arm 43 is arranged in the center of the furnace. The lance 41 is connected with a burdening means 42 via a proportioning device 44. The lance 41 and/or the proportioning device 44 is/are connected to a gas feed device 45. The lance 41 is separated from the lid 13 by a sliding seal 14. The lance support arm 43 can be moved vertically by means of a control device 52 with a control-type connection to a measuring instrument 51 of an immersion depth measuring device 50. The measuring instrument 51 is connected with the lance 41 and with the metal bath 19 by measuring techniques.

Figure 2:
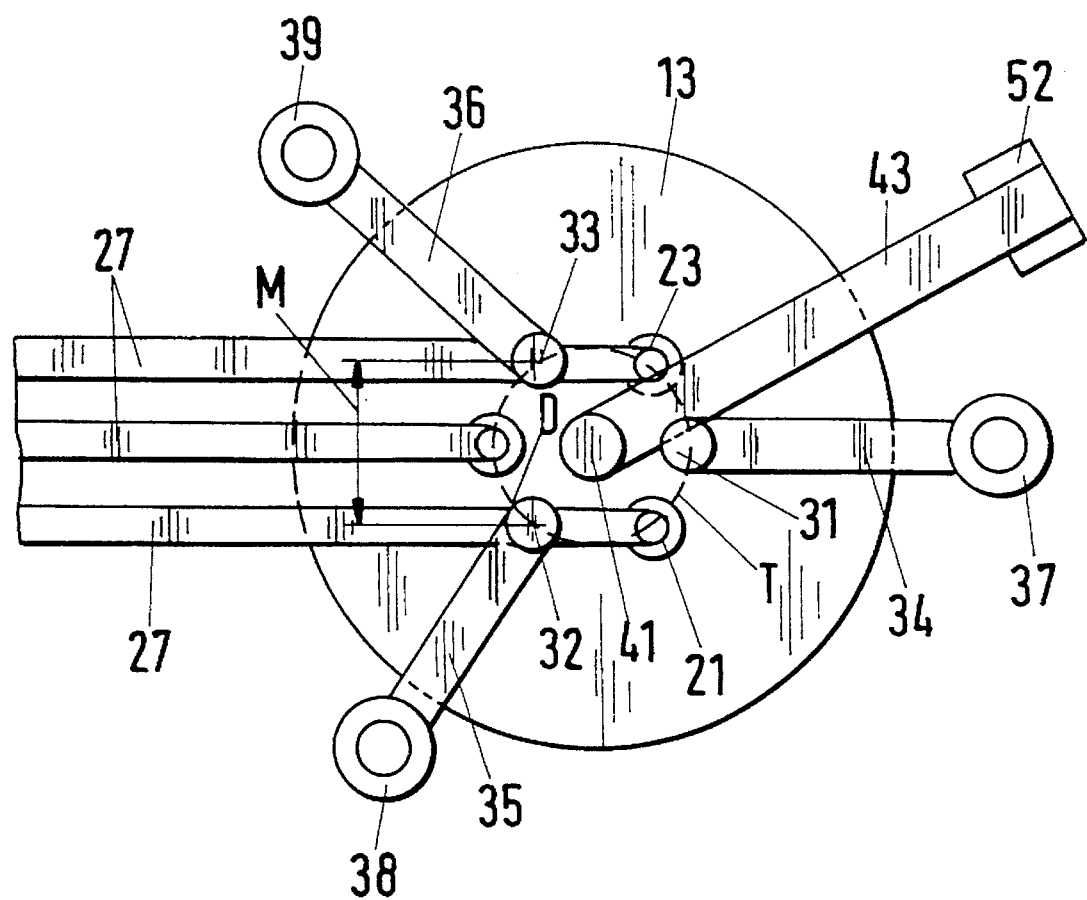
FIG. 2 is a top view of the furnace installation.

FIG. 2 shows a top view of the low-shaft furnace 10 with electrodes 21–23 which are fastened to the electrode support arms 27. Screws 34–36 connected to the feed tubes 31–33 at one end and to pockets 37–39 at the other end are provided below the electrode support arms 27. The support arm 43 which is connected with the control device is provided above the electrode support arms 27, the lance 41 being fastened to the head of the support arm 43.

Figure 3:
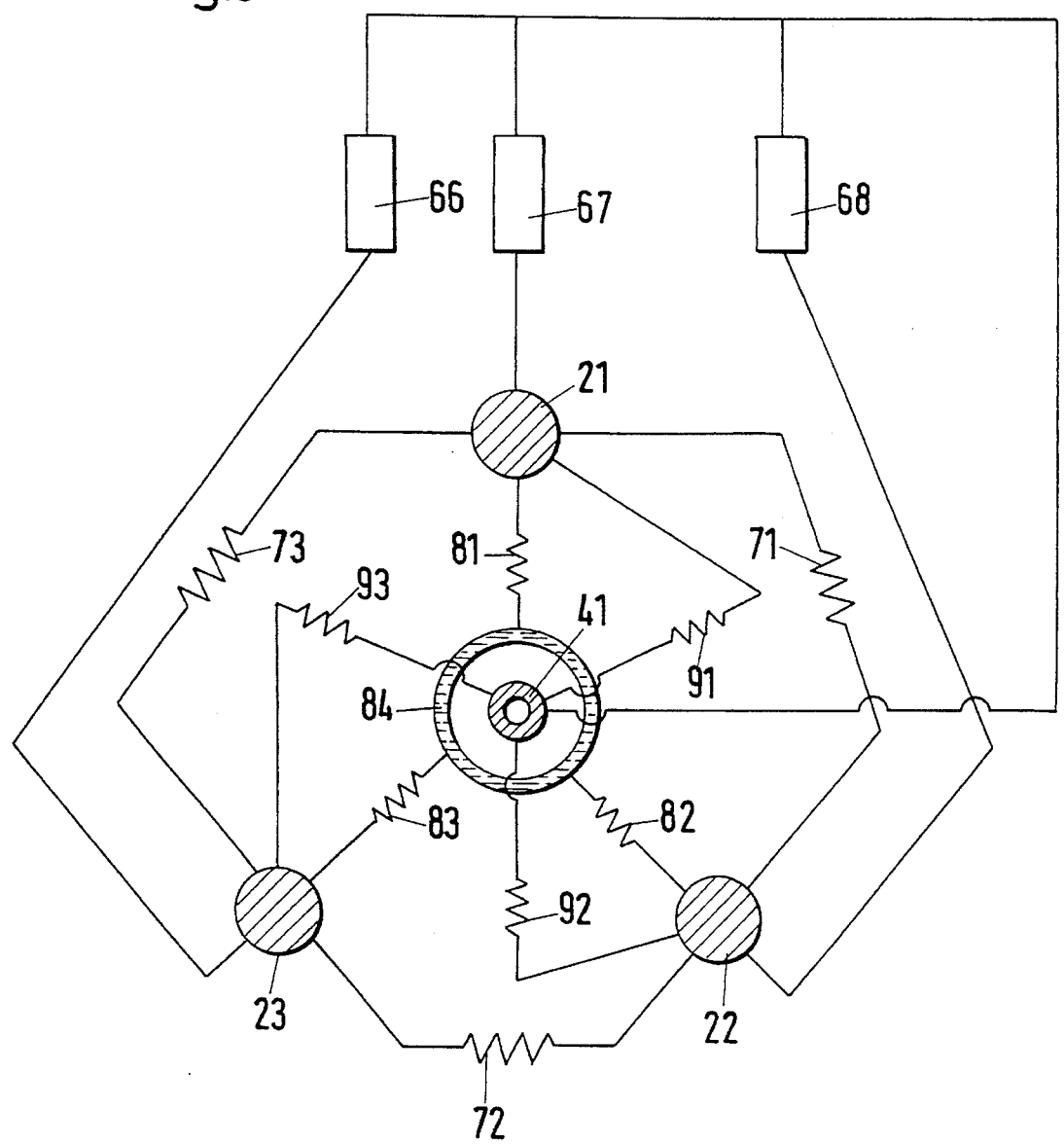
FIG. 3 shows the electric circuit in an extra star electrode.

FIG. 3 is a diagram of the electric control when using the lance 41 as an extra star electrode with transformers 66–68 arranged in the secondary winding of the star connection, electrodes 21–23, lance electrode 41, delta resistors 71–73, star resistors 81–83 and bath 84, as well as star resistors 91–93 between the electrodes 21–23 and the lance electrode 41.

Figure 4A:
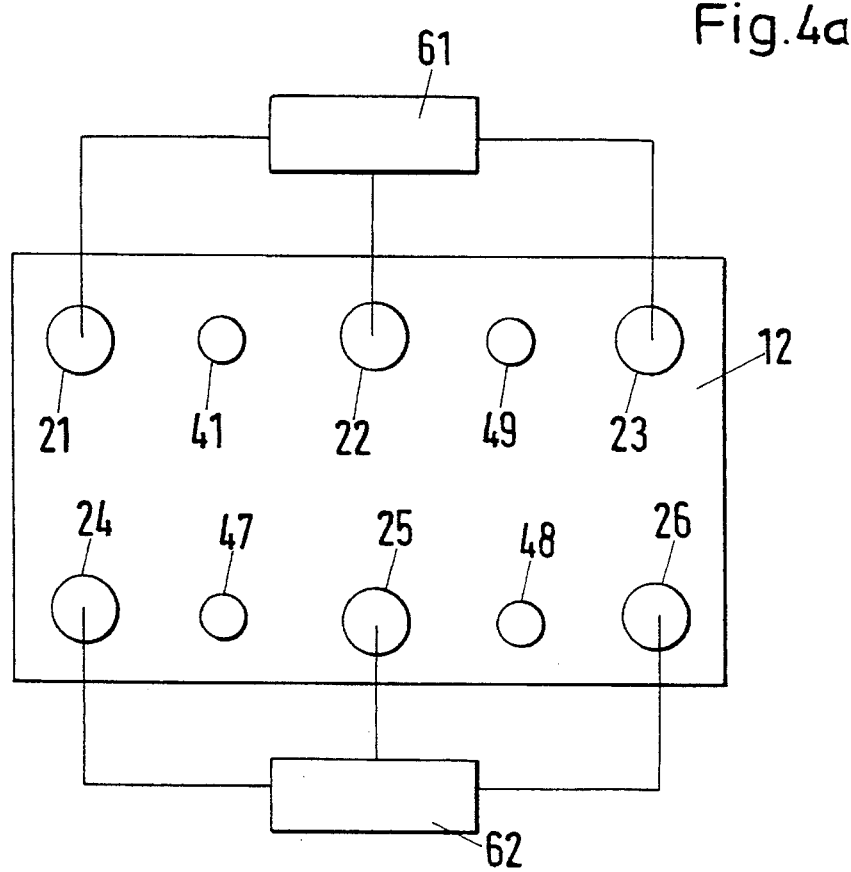
FIGS. 4a and 4b show a diagram of a six-electrode furnace installation.
Figure 4B:
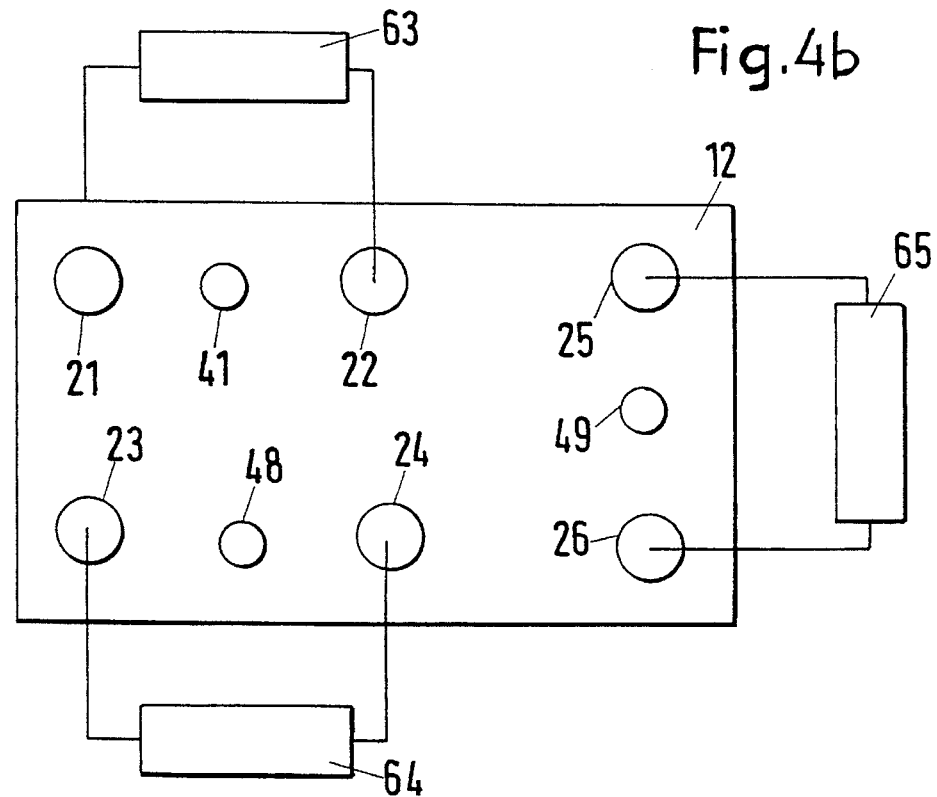

FIGS. 4a and 4b show furnaces with six electrodes. The upper vessel 12 of these furnaces has a rectangular shape. The electrodes 21–26 have a six-fold arrangement as on the face of a die. In FIG. 4a, the electrodes 21–26 are connected to three-phase transformers 61, 62. The lances 41, 49 and 47, 48, respectively, are arranged in a line between two electrodes of a group of three-phase transformers.

In FIG. 4b two electrodes 21, 22 and 23, 24 and 25, 26, respectively, are connected to single-phase transformers 63–65. Each lance 41, 48 and 49 is arranged between two electrodes, respectively.

The invention is not limited by the embodiments described above which are presented as examples only but can be modified in various ways within the scope of protection defined by the appended patent claims.

We claim:

1. A process for disposal of filter materials, in which the material to be disposed of is combined with meltable slag of an electric low-shaft furnace having electrodes with a diameter (D) and a hearth with a bottom, the process comprising the steps of:

a) charging the filter material to be disposed of via a charging device at least one of onto and into a slag bath in the furnace;

b) simultaneously introducing additives comprising fluxing agents, slag-making constituents and reducing agents into the slag via a separate immersion lance; and c) during the introducing of the additives, adjusting variables to form an electrical resistance which includes essential changes in center distance (M) between the electrodes to have a ratio of electrode diameter to center distance of D/M=0.25–0.35, level of the slag bath, and immersion depth of the electrodes in the bath so that 70% of electrical energy required for melting is introduced between the electrodes and 30% of the electrical energy is introduced between the electrodes and a metal bath formed on the hearth bottom.

2. A process according to claim 1, wherein the electrodes are hollow, the process including charging at least one of additional additives and materials to be disposed of via the hollow electrodes provided with bore holes.

3. A process according to claim 1, including introducing the additives into a region of highest concentration of the electrical energy required for melting.

4. A process according to claim 3, including adding the additives to the slag bath while taking into account consumption of the immersion lance in a region of its opening in a controllable, adjustable, geometrical position.

5. Process according to claim 4, including introducing electrical energy into the bath via the immersion lance to supplement the electrodes.

6. A low-shaft furnace for disposing of filter material, comprising: a furnace vessel having an upper portion, a lower portion and a lid; at least three electrodes which project through the lid of the furnace vessel into a meltable slag floating on a metal bath in the lower portion of the furnace vessel, the electrodes having a diameter (D) with a ratio to a center distance (M) between the electrodes of D/M=0.25–0.35; a waste material feed device having at least one feed that opens out into the upper portion below the lid; burdening means for providing additives; a vertically movable support arm; and a lance fastened to the vertically movable support arm and connected to the burdening means so as to communicate with the furnace lid via a sliding seal, the lance being arranged axially parallel to the electrodes and equidistant therefrom.

7. A low-shaft furnace according to claim 6, wherein the lance and the electrodes are made of the same material.

8. A low-shaft furnace according to claim 7, and further comprising a control device and measuring means connected with the molten metal bath and a head of the lance for detecting immersion depth of the lance and moving the lance support arm vertically via the control device.

9. A low-shaft furnace according to claim 7, wherein the lance is constructed as an electrode, the electrodes being connected in a three-phase system to transformer windings in a star connection, and the lance which is constructed as an electrode being connected with the star point of the transformer phase winding.

10. A low-shaft furnace according to claim 6, and further comprising proportioning means for connecting the lance with the burdening means.

11. A low-shaft furnace according to claim 10, and further comprising gas feed means connected to the proportioning means.

12. A low-shaft furnace according to claim 6, wherein the electrodes are in three phase operation, three feed tubes being provided which are arranged substantially on a partial circle formed by the electrodes centrally between the electrodes, and further comprising a volume-proportioning feed connected to each feed tube.

13. A low-shaft furnace according to claim 12, wherein the feed tubes are movable vertically in a controllable manner.

14. A low-shaft furnace according to claim 6, and further comprising a waste material conveying device, the electrodes being hollow electrodes which are connected to the waste material conveying device.

15. A low-shaft furnace according to claim 14, wherein six electrodes are provided and are arranged by pairs in rows of three relative to one another, and further comprising three-phase transformers connected to the electrodes, the lances being located between the electrodes arranged in rows.

16. A low-shaft furnace according to claim 14, comprising single phase transforming, six electrodes being provided and connected in pairs respectively to single phase transformers, the lances arranged between the electrodes of the respective pairs.

17. A low-shaft furnace according to claim 7, wherein the lance and the electrodes are made of graphite.

* * * * *